United States Patent [19]

Bauer, deceased et al.

[11] 4,249,747

[45] Feb. 10, 1981

[54] PHONOGRAPH PICK-UP CARTRIDGE

[76] Inventors: Benjamin B. Bauer, deceased, late of Stamford, Conn.; by Ida Bauer, executrix, 92 Red Fox Rd., Stamford, Conn. 06903

[21] Appl. No.: 62,015

[22] Filed: Jul. 30, 1979

[51] Int. Cl.$^3$ .................... G11B 3/02; H04R 11/12

[52] U.S. Cl. .................................. 369/136; 369/146; 369/172

[58] Field of Search ................ 274/37; 179/100.41 M, 179/100.41 S, 100.41 Z

[56] References Cited

U.S. PATENT DOCUMENTS

| | | | |
|---|---|---|---|
| 2,310,048 | 2/1943 | Albersheim | 179/100.41 Z |
| 2,820,853 | 1/1958 | Dally | 179/100.41 Z |
| 3,918,723 | 11/1975 | Nakajima et al. | 274/37 |
| 4,011,417 | 3/1977 | Kageyama et al. | 274/37 |
| 4,089,530 | 5/1978 | Kawabe et al. | 274/37 |
| 4,136,884 | 1/1979 | Iyeta | 274/37 |

*Primary Examiner*—Steven L. Stephan
*Attorney, Agent, or Firm*—Parmelee, Johnson, Bollinger & Bramblett

[57] ABSTRACT

A magnetic phonograph pick-up cartridge having a fixed assembly portion and a replaceable assembly portion wherein the replaceable portion includes self-contained, longitudinally-extending stylus pole pieces surrounding a pivotally mounted stylus magnet. One end portion of the magnet has a stylus-containing shank connected so that movement of the stylus by a phonograph record groove will cause a related pivotal movement of the magnet. The stylus pole pieces, which could include one or two pole piece pairs, are positioned to define a longitudinally extending pole gap. The magnet has a longitudinal dimension less than that of the pole pieces and is positioned within the pole gap. A resilient collar is attached to the stylus pole pieces and is used to pivotally mount the magnet so that movements of the stylus will alter the magnetic flux coupled from the magnet to the stylus pole pieces. Outer surfaces of the stylus pole pieces are slidably received by inner surfaces of corresponding sensing pole pieces included in the pick-up cartridge fixed portion. Each sensing pole piece has a corresponding sensing coil attached so that magnetic flux changes can be converted to electrical signals for subsequent amplification and processing. The replaceable assembly portion, in having self-contained pole pieces, allows a placing of the magnet extremely close to the stylus pole piece inner surfaces, thereby providing a sensitivity to magnetic flux changes unachievable by conventional pick-up cartridges.

20 Claims, 10 Drawing Figures

FIG. 1
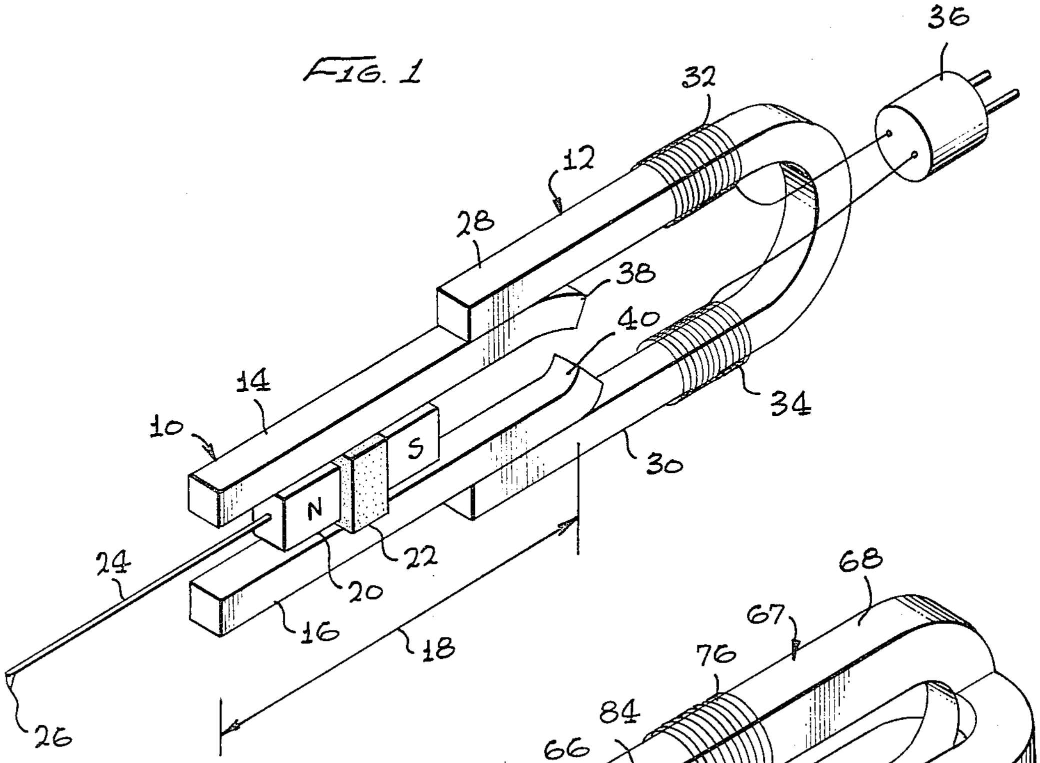
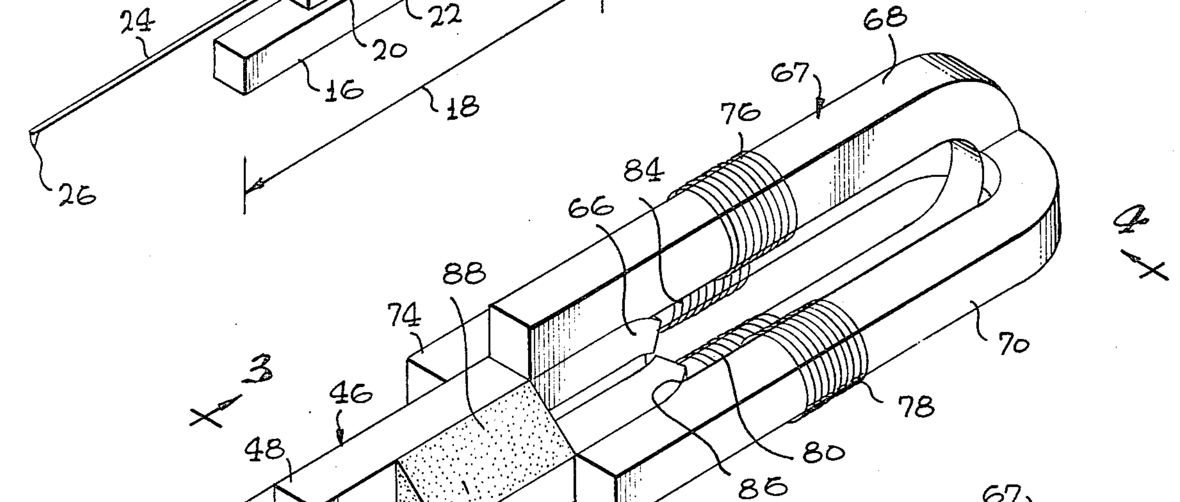
FIG. 2
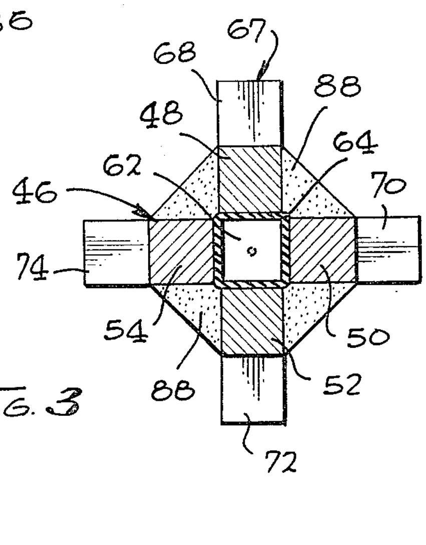
FIG. 3

FIG. 4
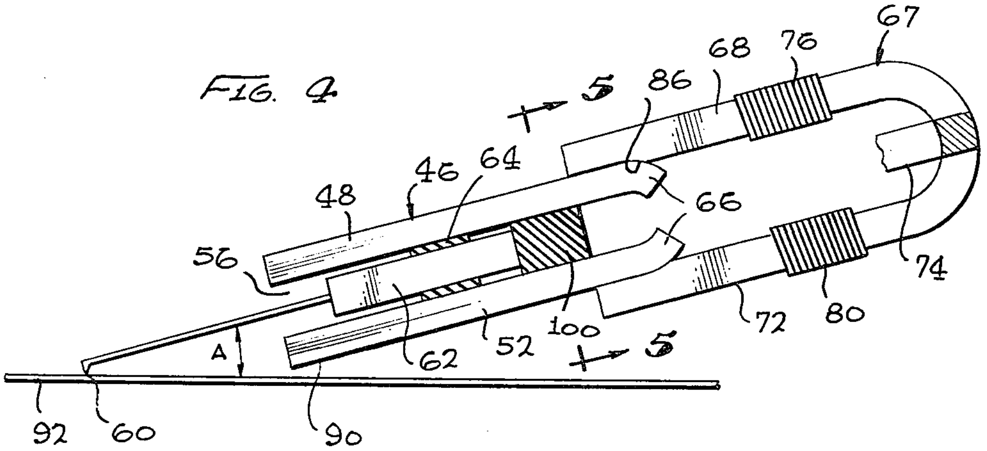
FIG. 6
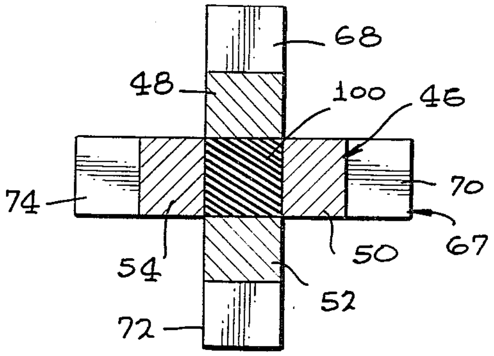
FIG. 5
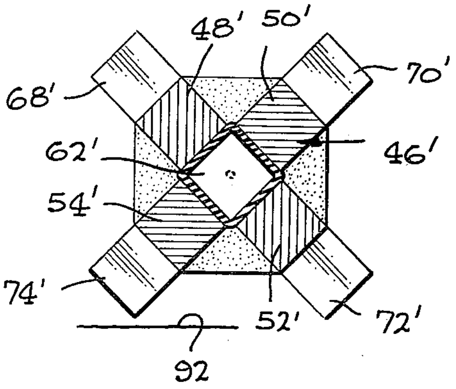
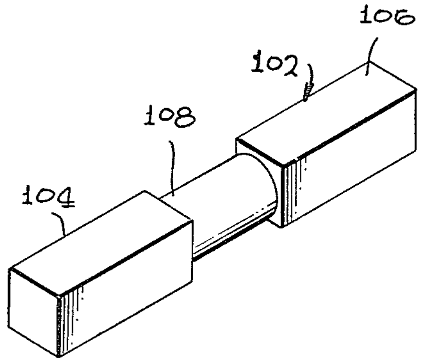
FIG. 7
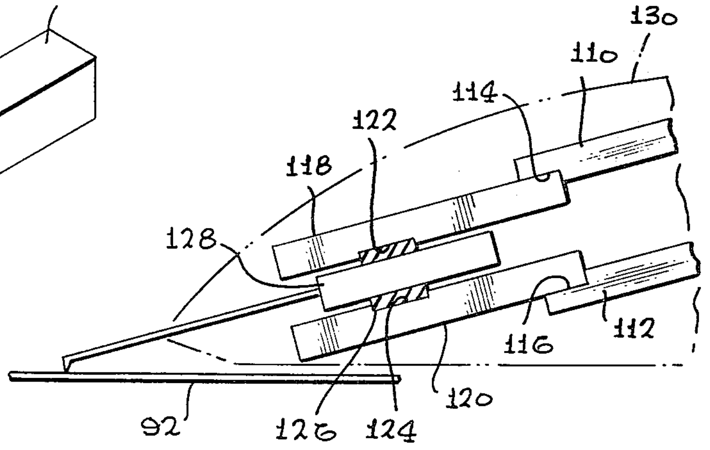
FIG. 8

FIG. 9
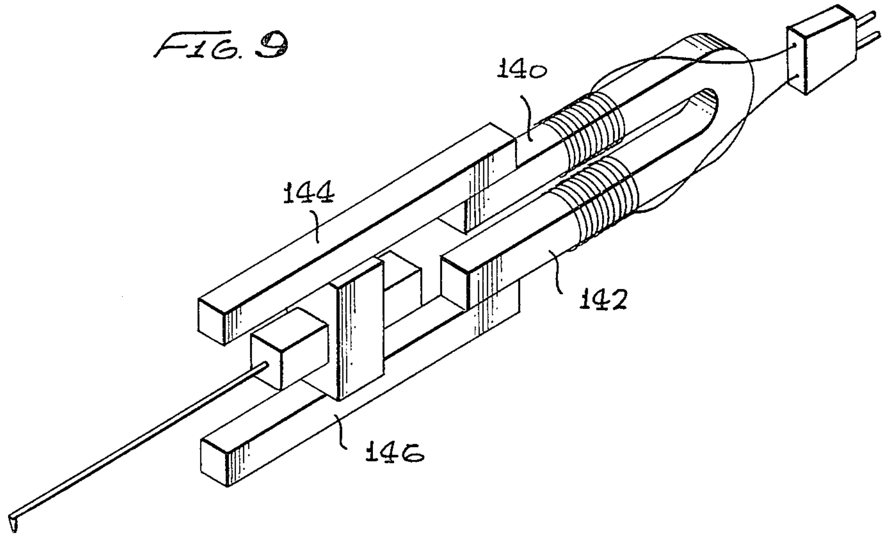
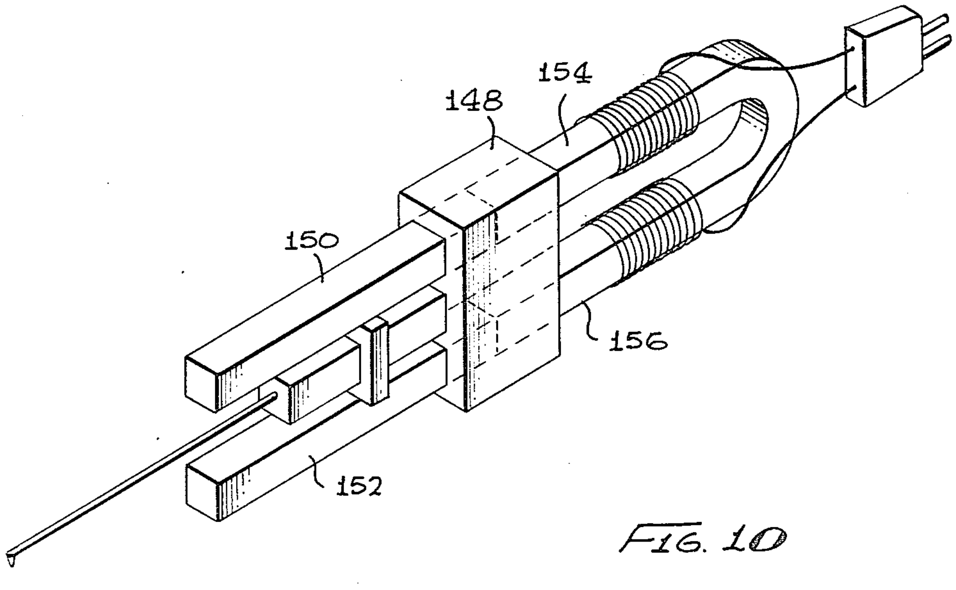
FIG. 10

PHONOGRAPH PICK-UP CARTRIDGE

BACKGROUND OF THE INVENTION

The invention relates to apparatus for the transformation of mechanical vibrations into electrical impulses, and more particularly to a magnetic phonograph pick-up cartridge for reproduction of sound or visual images from recorded disks.

Electromagnetic phonograph pick-up cartridges conventionally include a fixed assembly portion and a replaceable assembly portion, the replaceable portion generally including a stylus which may become worn or damaged during use. Frequently, the replaceable portion includes a stylus magnet which is pivotally mounted within an enclosure. The fixed portion is adapted to hold the enclosure and includes magnetic sensing poles which have associated sensing coils for converting magnetic flux changes into electrical signals. Movement of the stylus magnet caused by the stylus tracking recorded grooves on the phonograph disk result in magnetic flux changes inducing electrical signals in the sensing coils. A typical problem with magnetic phonograph cartridges has been in providing a means whereby the delicate stylus/shank/magnet assembly can be replaced while still maintaining high pick-up sensitivity which is related to the degree of magnetic coupling between the stylus magnet and pole pieces. High pick-up sensitivity allows a reduction in stylus magnet mass, which in turn provides reduced stylus tip impedance and a lower tracking force. Minimizing the air gap between magnet and pole pieces, and thus minimizing magnetic reluctance, is one obvious way to increase sensitivity. Some conventional replaceable assemblies have the stylus magnet in an enclosure which can be slidably received by the sensing pole tips. However, the thickness of the enclosure containing the stylus magnet adds to the reluctance of the pick-up cartridge and reduces magnetic coupling and sensitivity. In other replaceable assemblies, sensing poles have been divided into two portions, one portion being removable in conjunction with the stylus magnet and the other portion containing the sensing coils. However, such cartridges typically have the removable pole portion outside of, or colinear, with the non-removable pole portion, and the stylus magnet located between the removable and non-removable pole portions, thereby resulting in a bulky unit having an unacceptably large vertical tracking angle. In addition, mechanical tolerance build-up between the sensing pole portions have necessitated larger magnets to provide adequate magnetic flux across larger air gaps between the magnet and sensing pole surfaces, thereby increasing stylus tip impedance and requiring a damping means to reduce vibrational problems. The pick-up cartridge provided by the invention solves the above problems.

SUMMARY OF THE INVENTION

The invention provides a phonograph pick-up cartridge having a replaceable assembly portion and a fixed assembly portion. The replaceable assembly portion includes two or more longitudinally extending stylus pole pieces whose inner surfaces defines a longitudinally extending pole gap. A longitudinally magnetized stylus magnet having one end portion connected to a stylus-containing shank is pivotally mounted in the pole gap so that its other end is entirely contained within the pole gap.

In a specific embodiment of the invention, the pivotal mount for the stylus magnet includes a collar formed of resilient material. The collar is centered near the percussion axis of the magnet/shank/stylus combination. The collar is formed of a resilient material which is biased to compensate for the average moment exerted on the stylus magnet exerted by the stylus in a record groove so that the magnet/shank/stylus combination when tracking will be oriented such that its longitudinal axis on average is substantially parallel to that of the longitudinal axes of the stylus pole pieces. The stylus magnet longitudinal dimension is chosen so that it is entirely contained within the longitudinal dimension of the pole gap. Thus minimum magnetic reluctance can be achieved by minimizing the distance between the inner surface of the stylus pole pieces and the longitudinal-extending surfaces of the stylus magnet, thereby allowing a lighter stylus magnet to be used to achieve a given amount of useful magnetic flux. The replaceable assembly portion thus described is adapted to be slidably received by sensing pole pieces each of which has a corresponding sensing coil. Magnetic flux variations in the stylus pole pieces are thereby carried to the sensing pole pieces, thereby creating electrical signals in the sensing coils related to movement of the stylus. The sensing coils may be connected in a standard monophonic, stereophonic, or quadraphonic configuration.

The stylus pole pieces need only be thick enough to carry magnetic flux induced by positional changes in the stylus magnet. Since the stylus magnet is closely contained within the pole gap, its surfaces can be placed very close to the inner surfaces of the stylus pole pieces. It is theorized that such placement could be within 0.003 inches of the pole pieces, a distance much smaller than that achieved in conventional pick-up cartridges. Thus, a pick-up cartridge provided by the invention has a low tracking angle, a very small air gap between the magnet and pole pieces, a small, light moving magnet, and low stylus tip impedance. These advantages are achieved by incorporating stylus pole pieces in the replaceable assembly portion which have side surfaces proximal to the longitudinal dimension of the stylus magnet.

BRIEF DESCRIPTION OF THE DRAWINGS

FIG. 1 is a perspective view showing the relationship between the basic elements of the invention as applied to a monophonic pick-up assembly;

FIG. 2 is a perspective view of the pick-up assembly configured for stereophonic recordings;

FIG. 3 is a cross-sectional view taken along lines 3—3 of FIG. 2;

FIG. 4 is a cross-sectional view taken along lines 4—4 of FIG. 2;

FIG. 5 is a cross-sectional view taken along lines 5—5 of FIG. 4;

FIG. 6 is a cross-sectional view showing a different orientation of the stylus pole pieces and stylus magnet with respect to a phonograph record surface;

FIG. 7 is a perspective view of an alternate configuration of the stylus magnet;

FIG. 8 is a cross-sectional, side view showing an alternate configuration of stylus pole pieces for containing the resilient collar for pivotally mounting the stylus magnet;

FIG. 9 is a perspective view showing an embodiment wherein the inner surfaces of the stylus pole pieces are slidably received by the outer surfaces of the sensing pole pieces; and FIG. 10 is a perspective view showing an embodiment wherein end surfaces of the stylus pole pieces abut end surfaces of the sensing pole pieces.

DETAILED DESCRIPTION

Detailed illustrated embodiments of the invention are disclosed herein. These embodiments exemplify the invention and are currently considered to be the best embodiments for such purposes. However, it is to be recognized that other means for pivotally mounting the stylus magnet between the stylus pole pieces could be utilized. Accordingly, the specific embodiments disclosed are only representative in providing a basis for the claims which define the scope of the present invention.

As previously explained, the invention discloses a pick-up cartridge having a replaceable assembly portion and fixed assembly portion. The replaceable portion includes one or more pairs of longitudinally extending stylus pole pieces, each of which is spaced-apart to define a longitudinally-extending pole gap. A longitudinally-extending stylus magnet is pivotally mounted in the pole gap so that pivotal movement thereof will alter the magnetic flux in the stylus pole pieces. This flux is then transferred to the sensing pole pieces which slidably receive the stylus pole pieces. Sensing coils are provided on each sensing pole piece, thereby providing electrical signals which are related to movements of the stylus magnet. The replaceable portion as above described provides an extremely sensitive means for detecting small movements in the stylus magnet because of extremely close spacing that can be achieved between the stylus magnet surfaces and the stylus pole pieces.

Referring to FIG. 1, the basic elements of the invention can be seen. A replaceable assembly portion 10 is adapted to be slidably received by a fixed assembly portion 12, the two portions 10 and 12 comprising a phonograph pick-up cartridge. The replaceable portion 10 includes a first stylus pole piece 14 and a second stylus pole piece 16. The first and second stylus pole pieces 14 and 16 are spaced apart so as to form a longitudinally-extending pole gap 18 in which a stylus magnet 20 is pivotally mounted by a resilient collar 22. Connected to one end portion of the stylus magnet 20 is a shank 24 having a stylus 26 attached to its unconnected end. The first and second pole pieces 14 and 16 are slidably received by first and second sensing pole pieces 28 and 30, respectively. A first sensing coil 32 and a second sensing coil 34 are wound around the first and second sensing pole pieces, respectively, their outputs being provided to a plug 36. The two sensing coils 32 and 34 can be interconnected in a hum-bucking arrangement commonly used in magnetic phonograph pick-ups.

As previously explained, an advantage of the replaceable portion 10 provided by the invention is that the first and second stylus pole pieces 14 and 16 inner surfaces can be spaced extremely close to the entire longitudinal length of the stylus magnet 20, thereby decreasing the magnetic reluctance between the stylus magnet 20 and the stylus pole pieces 14 and 16. It is theorized that with the above configuration, the stylus magnet 20 can be located so that its sides along their entire longitudinal length are within 0.003 to 0.010 inches of the stylus pole piece inner surfaces. The resilient collar 22 is formed of an elastomer material, and centered around or near the center of movement or the percussion axis of the magnet/stylus/shank combination. The percussion axis is defined as the axis around which the magnet vibrates when struck at the stylus tip. It is preferable that the stylus magnet 20 be entirely contained within the longitudinally extending pole gap 18 defined by the first and second stylus pole pieces 14 and 16, respectively, in order to minimize magnetic reluctance and thus maximize sensitivity of the system. However, a small portion of the stylus magnet can extend beyond the stylus pole piece end portion proximal to the stylus without adding a significant amount of magnetic reluctance. The ends 38 and 40 of the first and second pole pieces 14 and 16, respectively, are curved inwardly towards each other in order to aid in the insertion of the replaceable pick-up cartridge 10.

In operation, motion imparted to the stylus by grooves on a phonograph record will cause slight movements of the stylus magnet 20 as it pivots within its resilient collar 22. As a result of this pivoting, alternating magnetic flux flows through the magnetic circuit formed by the junction of the stylus pole pieces 14 and 16 and the sensing pole pieces 28 and 30. This flux variation induces corresponding voltages in the first and second sensing coils 32 and 34. As previously explained, the advantage of this type of pick-up is that the replaceable portion 10 includes stylus poles which can be placed extremely close to the stylus magnet along its entire length, thus ensuring a minimized magnetic reluctance between the magnet and the poles as the stylus is moved. This minimized reluctance increases the sensitivity of the cartridge and minimizes the movement required to obtain an output signal having a given amplitude. To obtain a given sensitivity, a lighter magnet and stylus pole pieces can thus be utilized, thereby allowing a lighter stylus bearing force.

The shank 24 is formed of a non-conductive, light, strong, low compliance alloy. The stylus magnet 20 can be of a permanent variety, longitudinally polarized, and formed of a ferromagnetic material. The collar 22 has sufficient resiliency to return the stylus magnet 20 to a predetermined orientation with respect to the pole gap 18 and is biased to maintain the longitudinal axis of the stylus magnet 20 substantially centered within the pole gap 18 when the stylus is tracking a record groove. The stylus pole pieces 12 and 14 are shown to have a square cross-section but other cross-sections could also be utilized.

A stereophonic or quadraphonic pick-up cartridge having a replaceable assembly portion according to the invention is shown in FIG. 2. Referring to FIGS. 2 and 3, a replaceable assembly portion 46 includes first, second, third and fourth stylus pole pieces 48, 50, 52 and 54. These pole pieces are spaced apart to define a longitudinally-extending, rectangularly-shaped pole gap 56. A shank 58 having one end connected to a stylus 60 and the other end connected to a stylus magnet 62 is provided. FIG. 3 is a cross-sectional view taken along line 3—3 of FIG. 2 and shows the stylus magnet 62 and a resilient collar 64, these being configured as explained in the FIG. 1 description. As can be seen, spacing between the sides of the rectangularly shaped stylus magnet 62 and the inner surfaces of the stylus pole pieces 48, 50, 52, and 54 is extremely small. The resilient collar 64 provides a pivotal mounting for the stylus magnet 62.

As in the first embodiment, the longitudinal dimension of the stylus magnet 62 is less than that of the stylus pole pieces, thereby maximizing the magnetic flux from the stylus magnet 62 to the stylus pole pieces. The stylus pole piece end portions, one of which is shown at 66, are all curved inwardly into the pole gap 56, thereby aiding in insertion of the replaceable assembly portion into the fixed assembly portion. Although this configuration is preferred, it is not necessary that the stylus pole piece ends be inwardly directed.

A fixed assembly portion 67 is also provided, the fixed portion having first, second, third and fourth sensing pole pieces 68, 70, 72 and 74. The sensing pole pieces have corresponding sensing coils 76, 78, 80 and 84. The outer surfaces of the four stylus pole pieces 48, 50, 52 and 54 are slidably received by the inner surfaces of their corresponding sensing pole pieces 68, 70, 72 and 74. Each sensing pole piece is formed to provide a seat 86 so that when the stylus pole pieces are slidably positioned within corresponding sensing pole pieces, the seat 86 will abut against the curved ends of the stylus pole pieces. Leads from the sensing coils 76, 78, 80 and 84 are provided to an interconnection plug means not shown. The fixed assembly portion 67 can be mounted in a variety of enclosures (not shown), the enclosure providing electrical shielding and an opening for insertion and removal of the replaceable assembly portion 46. The stylus pole pieces can be positioned and held with respect to each other in a variety of ways, one being the use of an epoxy material 88 formed to contain the stylus ple pieces and resilient collar. Referring to the cross-sectional view shown in FIG. 3, the epoxy material 88 interconnects side surfaces of each stylus pole piece, the four stylus pole pieces and epoxy material thereby defining the pole gap 56 in which the resilient collar 64 is positioned. As in the previous description, the stylus magnet 62 is positioned within the resilient collar 64 so that it will pivot at or near the percussion axis. The gaps between the sides of the stylus magnet 62 and the stylus pole piece inner surfaces are very small for the reasons previously explained.

In operation, vertical movements of the stylus induce flux changes in the first and third stylus pole pieces 48 and 52 and the first and third sensing poles 68 and 72, thereby inducing voltages in the first and third sensing coils 76 and 80. In a similar manner, lateral movements of the stylus 60 introduce flux changes in the second and fourth stylus pole pieces 50 and 54, and the second and fourth sensing poles 70 and 74, thereby inducing voltages in the second and fourth sensing coils 78 and 84. Thus, a replaceable assembly portion has been provided in which the entire length of the stylus magnet 62 is positioned immediately adjacent to sensing poles, thereby providing a degree of magnetic efficiency unobtainable by conventional pick-up cartridges.

Referring now to FIG. 4, a cross-sectional view taken along lines 4—4 of FIG. 2 is shown. As can be seen, the entire replaceable portion 46 and fixed portion 67 can be located with respect to a record surface 92 so as to provide a small vertical tracking angle A. As is well known to those familiar with phonograph pick-up cartridges, a small vertical tracking angle (15°–18°) is desirable in order to minimize distortion. This embodiment also incorporates a viscoelastic damper 100 which is attached to one end of the stylus magnet 62. Referring to FIG. 5, the damper 100 abuts the inner surfaces of the four stylus pole pieces 48, 50, 52 and 54, and is attached thereto. Although a damper 100 is shown, it may not be required. Incorporation of the damper 100 is partially determined by the characteristics of the resilient collar 64.

Most stereophonic recordings have channels recorded on each of two sides of a groove, the sides being at an angle of 45° with respect to the phonograph disk surface, each channel being cut at an angle of 90° with respect to the other channel. This configuration has been generally accepted by the industry as it results in recordings which may be reproduced with excellent fidelity and adequate channel separation. Referring to FIG. 6, a cross-sectional view of the replaceable assembly portion 46' configured for such a recording is shown. This cross-sectional view corresponds to that of FIG. 3. As can be seen, the stylus pole pieces 48', 50', 52' and 54' have been rotated 45° with respect to those shown in FIG. 3. Of course, the sensing pole pieces would have to be correspondingly rotated in order to make sliding contact with the rotated stylus pole pieces. Thus, excursions on one record groove side will cause the stylus magnet 62' to pivot between the first and third stylus pole pieces 48' and 52', and excursions along the other groove side will cause the stylus magnet 62' to pivot between the second and fourth stylus pole pieces 50' and 54'. Magnetic flux carried by the first and third sensing pole pieces 68' and 72' and the second and fourth sensing pole pieces 70' and 74' provides 45°–45° stereophonic signals, commonly known as the WESTREX System.

Another configuration for a stylus magnet 102 is shown in FIG. 7. Here, the stylus magnet 102 is divided into a first rectangular portion 104 and a second rectangular portion 106, the two portions 104 and 106 being interconnected by a cylindrical portion 108. The stylus magnet 102 is formed of a single piece of magnetic material, and the circular portion 108 is centered at or near the percussion axis of the magnet/stylus/shank assembly. The resilient collar previously described is adapted to fit over the circular portion 108. The purpose of this configuration is to provide more uniform compliance of the resilient collar for different movements of the stylus in the stereophonic embodiment of the invention.

Referring now to FIG. 8 an alternate configuration of sensing pole pieces 110 and 112 is shown, the pole pieces having notches 114 and 116 formed therein. The purpose of these notches is to provide positive seating for the stylus pole pieces 118 and 120. For the stereophonic configuration shown in FIG. 2, pole pieces orthogonal to those shown would also be provided. The stylus pole pieces 118 and 120 are also shown having notches 122 and 124 formed therein for containment of a resilient collar 126. The purpose of the notches 122 and 124 is to provide a positive means for seating the resilient collar 126, while at the same time providing a means for positioning a stylus magnet 128 so that its longitudinal surfaces will be very close to the inner surfaces of the stylus pole pieces as previously explained. In addition, the notches 122 and 124 provide a uniform bearing mechanism while minimizing the size of the resilient collar 126 and prevent creeping of the collar 126 during use. Also shown in FIG. 8 is a dotted line 130 in the shape of a housing which could be utilized to contain the pick-up assembly.

The preceding descriptions all show outer surfaces of the stylus pole pieces being slidably received by inner surfaces of the sensing pole pieces. However, alternate means of minimizing magnetic reluctance between the stylus pole pieces and sensing pole pieces could be utilized. Referring to FIG. 9, the sensing pole pieces 140 and 142 are spaced apart so that their outer surfaces are slidably received by and are in abutting contact with the inner surfaces of the stylus pole pieces 144 and 148. In another embodiment shown in FIG. 10, a holding block 148 formed of an epoxy material or the like is adapted to receive end portions of stylus pole pieces 150 and 152 and sensing pole pieces 154 and 156 so that their end surfaces abut against each other.

It should now be apparent that a phonograph pick-up cartridge has been described in which a replaceable portion and a fixed portion are included. The replaceable portion includes a plurality of stylus pole pieces which define a longitudinally extending pole gap containing a stylus magnet. The stylus magnet is connected to a stylus by a shank. A resilient collar is provided which positions the stylus magnet entirely within the pole gap so as to minimize magnetic reluctance between the stylus magnet and the stylus pole pieces as the magnet is pivoted within the resilient collar. The fixed portion of the pick-up cartridge includes sensing pole pieces and sensing coils, the sensing pole pieces being adapted to slidably receive the stylus pole pieces. Thus, a pick-up cartridge has been described which tends to minimize magnetic reluctance between the stylus magnet and sensing pole pieces for a given amount of stylus movement. The pick-up cartridge provided by the invention can be configured to have an extremely low vertical tracking angle and be ultrasensitive to stylus movements induced by a phonograph recording.

What is claimed is:

1. For use in a phonograph tone arm having pick-up coil means associated with at least one pair of spaced sensing pole pieces, a replaceable stylus assembly comprising:

at least two longitudinally extending parallel stylus pole pieces formed of magnetically permeable material spaced apart to define a longitudinally extending pole gap therebetween, a longitudinally extending elongated permanent magnet having first and second ends, a stylus-containing shank connected to the first end of said elongated magnet, mounting means connected to said stylus pole pieces for pivotally mounting said elongated magnet between said stylus pole pieces with the longitudinal axis of said elongated magnet extending parallel with said longitudinally extending stylus pole pieces, said elongated magnet having a width which is only very slightly less than the width of said pole gap for defining at least two elongated narrow spaces between said elongated magnet and the respective stylus pole pieces, thereby enabling said elongated magnet to pivot between said stylus pole pieces in response to movement of said shank for causing the first and second ends of said elongated magnet to move toward and away from the respective pole pieces for varying the magnetic flux through said pole gap, and said stylus pole pieces, said elongated magnet, said stylus-containing shank and said mounting means comprising a removable, replaceable stylus assembly with the surfaces of said stylus pole pieces opposite the end surfaces of said stylus containing shank being exposed and accessible for movement into abutting relationship with said sensing pole pieces, whereby said stylus assembly can be conveniently removed and replaced as a unit without removing said sensing pole pieces and pick-up coil means from said tone arm.

2. The replaceable stylus assembly of claim 1 wherein said mounting means comprises a collar formed of a resilient material surrounding a portion of said magnet and attached to said stylus pole pieces.

3. The replaceable stylus assembly of claim 2 wherein said collar is centrally positioned about the percussion axis of said elongated magnet and stylus-containing shank combination.

4. The replaceable stylus assembly of claim 1 wherein said at least two longitudinally-extending parallel stylus pole pieces comprise four longitudinally-extending parallel stylus pole pieces spaced apart to define a longitudinally-extending pole gap, each stylus pole piece longitudinal axis being spaced at substantially 90° increments about a cylinder whose longitudinal axis is defined by the longitudinal axis of said elongated magnet.

5. The replaceable stylus assembly of claims 4 or 1 wherein end portions of said stylus pole pieces distal to said stylus-containing shank are curved inwardly toward the longitudinal axis of said elongated magnet.

6. The replaceable stylus assembly of claims 4 or 1 in which said long narrow spaces between said magnet and said stylus pole pieces have a width in the range of 0.003 inches to 0.01 inches.

7. The replaceable stylus assembly of claim 4 wherein said stylus pole pieces and said elongated magnet have rectangular cross-sections.

8. The replaceable stylus assembly of claim 1 wherein the longitudinal dimension of said elongated magnet is no greater than the longitudinal dimension of said pole gap and said elongated magnet is positioned so that its longitudinal dimension is entirely contained within said pole gap.

9. A phonograph pick-up cartridge with a replaceable stylus assembly comprising:

a fixed assembly having two or more longitudinally-extending parallel sensing pole pieces of magnetically permeable material with associated sensing coil means, said sensing pole pieces being symmetrically oriented about a central longitudinal axis, a replaceable stylus assembly having two or more longitudinally-extending parallel stylus pole pieces of magnetically permeable material spaced apart to define a longitudinally extending pole gap therebetween, said stylus pole pieces being symmetrically oriented in the same manner as said sensing pole pieces about the same central longitudinal axis, each of said stylus pole pieces being magnetically coupled to and in abutting contact with a corresponding sensing pole piece of the same orientation, a longitudinally-extending elongated, permanent stylus magnet having first and second ends, a stylus containing shank having a stylus mounted on one end thereof and mounted at the other end to said first end of said stylus magnet, mounting means connected to stylus pole pieces for pivotally mounting said stylus magnet between said stylus pole pieces with the longitudinal axis of said elongated magnet extending parallel with said longitudinally extending stylus pole pieces, said elongated magnet having a width which is slightly less than the width of said pole gap for defining at least two elongated narrow spaces between said elongated magnet and the respective stylus pole pieces, thereby enabling said elongated magnet to pivot between said stylus pole pieces in response to movement of said shank for causing the first and second ends of said elongated magnet to move toward and away from the respective pole pieces for varying the magnetic flux through said pole gap, and said stylus pole pieces, said elongated magnet, said stylus-containing shank and said mounting means comprising a removable, replaceable stylus assembly with the surfaces of said stylus pole pieces opposite the end surfaces of said stylus containing shank being exposed and accessible for movement into abutting relationship with said sensing pole pieces, whereby said stylus assembly can be conveniently removed and replaced as a unit without removing said sensing pole pieces and pick-up coil means from said tone arm.

10. The pick-up cartridge of claim 9 wherein said two or more longitudinally-extending sensing pole pieces comprise four longitudinally-extending sensing pole pieces and said two or more longitudinally-extending stylus pole pieces comprise four longitudinally-extending stylus pole pieces.

11. The pick-up cartridge of claim 10 wherein said mounting means comprises a resilient collar positioned in said pole gap surrounding a portion of said stylus magnet.

12. The pick-up cartridge of claim 11 wherein said collar is positioned about the percussion axis of said stylus magnet.

13. The pick-up cartridge of claim 11 wherein the inner surfaces of said stylus pole pieces have notches therein, said resilient collar being mounted in said notches.

14. The pick-up cartridge of claim 9 wherein said stylus magnet has front and rear portions having rectangularly-shaped cross-sections and a central portion having a cylindrically-shaped cross-section, and said mounting means comprising a resilient collar positioned in said pole gap surrounding a portion of said cylindrically-shaped central portion.

15. The pick-up cartridge of claim 9 wherein said stylus pole pieces are positioned such that their outer surfaces can be slidably received in abutting relationship with the inner surfaces of corresponding sensing pole pieces of the same orientation.

16. The pick-up cartridge of claim 15 wherein said inner surfaces of said sensing pole pieces define a seat for preventing said stylus pole pieces from being slidably received beyond a predetermined portion of their longitudinal lengths by said sensing pole pieces.

17. The pick-up cartridge of claim 15 wherein said stylus pole piece ends which are slidably received by said sensing pole pieces are curved inwardly toward the longitudinal axis of said stylus magnet.

18. The pick-up cartridge of claim 9 wherein said stylus pole pieces are positioned such that their inner surfaces can be slidably received by the outer surfaces of corresponding sensing pole pieces.

19. The pick-up cartridge of claim 1 wherein each of said stylus pole pieces is located so that one of its end surfaces can make abuting contact with the end surface of its corresponding sensing pole piece, said cartridge further having means for holding said end surfaces in abutting contact.

20. The pick-up cartridge of claim 10 wherein the longitudinal dimension of said stylus magnet is no greater than the longitudinal dimension of said pole gap and said magnet is positioned so that its longitudinal dimension is entirely contained in said pole gap.

* * * * *

UNITED STATES PATENT OFFICE

CERTIFICATE OF CORRECTION

Patent No. 4,249,747 Dated February 10, 1981

Inventor(s) Benjamin B. Bauer, deceased - by Ida Bauer, executrix

It is certified that error appears in the above-identified patent and that said Letters Patent are hereby corrected as shown below:

Column 5, line 31 "ple" should be -- pole --.

Column 6, line 19 "pieces" should be -- pieces --.

Column 10, line 28, Claim 19 "claim 1" should be -- claim 9 --.

Signed and Sealed this

*Twenty-sixth* Day of *May 1981*

[SEAL]

*Attest:*

RENE D. TEGTMEYER

*Attesting Officer* *Acting Commissioner of Patents and Trademarks*